(12) United States Patent
Cheng et al.

(10) Patent No.: US 8,749,156 B2
(45) Date of Patent: Jun. 10, 2014

(54) ELECTRIC LIGHTING DRIVER CIRCUIT

(75) Inventors: Chun-An Cheng, Kaohsiung (TW);
Chen-Wei Ku, Kaohsiung (TW)

(73) Assignee: I Shou University, Kaohsiung (TW)

( * ) Notice: Subject to any disclaimer, the term of this patent is extended or adjusted under 35 U.S.C. 154(b) by 12 days.

(21) Appl. No.: 13/553,904

(22) Filed: Jul. 20, 2012

(65) Prior Publication Data

US 2014/0021880 A1    Jan. 23, 2014

(51) Int. Cl.
H05B 37/02 (2006.01)
H05B 39/04 (2006.01)
H05B 41/36 (2006.01)
H05B 41/16 (2006.01)
H05B 41/24 (2006.01)

(52) U.S. Cl.
USPC ................ 315/219; 315/210; 315/254

(58) Field of Classification Search
None
See application file for complete search history.

(56) References Cited

U.S. PATENT DOCUMENTS

| | | | | |
|---|---|---|---|---|
| 6,274,988 B1 * | 8/2001 | De Vries | ......... | 315/307 |
| 7,218,060 B1 * | 5/2007 | Lin et al. | ......... | 315/219 |
| 2002/0012257 A1 * | 1/2002 | Takahama et al. | ......... | 363/95 |

* cited by examiner

*Primary Examiner* — Douglas W Owens
*Assistant Examiner* — Dedei K Hammond
(74) *Attorney, Agent, or Firm* — Alan Kamrath; Kamrath IP Lawfirm, P.A.

(57) ABSTRACT

An electric lighting driver circuit for driving an illuminating unit to emit light includes a flyback converting unit for converting a DC input voltage to a low ripple DC voltage, and a half-bridge converting unit electrically connected to the flyback converting unit, for converting the low ripple DC voltage to a low frequency, rectangular wave output voltage to drive the illuminating unit to emit light. The flyback converting unit includes a dual-output winding transformer connected to the half-bridge converting unit. The dual-output winding transformer includes a first winding at a primary side of the dual-output winding transformer and a second winding and a third winding at a secondary side of the dual-output winding transformer. The third winding converts leakage inductance attributed to the first winding and the second winding to electrical energy that is provided to the half-bridge converting unit.

4 Claims, 10 Drawing Sheets

ELECTRIC LIGHTING DRIVER CIRCUIT

BACKGROUND OF THE INVENTION

1. Field of the Invention

The invention relates to a driver circuit, more particularly to an electric lighting driver circuit.

2. Description of the Related Art

As shown in FIG. 1, a conventional in-vehicle electric lighting driver circuit 1 is electrically connected to an in-vehicle power source $V_1$ and a high intensity discharge (HID) lamp, and is for converting a direct current (DC) input voltage from the in-vehicle power source $V_1$ to an alternating current (AC) low frequency, rectangular wave voltage to drive the HID lamp. The in-vehicle electric lighting driver circuit 1 includes a flyback DC-to-DC converter 11 and a full-bridge DC-to-AC converter 12. The flyback DC-to-DC converter 11 is configured to boost the DC input voltage so as to provide a high DC voltage that is stable and that has relatively small ripples, and includes a power switch S, a single-output winding transformer 111 and an output diode D. The power switch S is operated at a high frequency to boost the DC input voltage to the high DC voltage.

The full-bridge DC-to-AC converter 12 is electrically connected to the flyback DC-to-DC converter 11 and the HID lamp, and includes an output capacitor $C_1$ and four power switches, namely $S_1$, $S_2$, $S_3$ and $S_4$. The power switches $S_1$, $S_2$, $S_3$ and $S_4$ are operated at a low frequency, in order to convert the high DC voltage to a low frequency, rectangular wave voltage that is necessary for the HID lamp to operate in a steady state.

Nonetheless, the full-bridge DC-to-AC converter 12 requires four power switches, raising the manufacturing costs of the electric lighting driver circuit 1. Moreover, FIG. 2 illustrates an extended structure of the conventional electric lighting driver circuit 1 depicted in FIG. 1, which is adapted to drive two HID lamps. Compared to the original structure, the extended structure employs an additional output capacitor $C_2$ and four additional power switches $S_5$, $S_6$, $S_7$ and $S_8$, bringing the manufacturing costs even higher.

SUMMARY OF THE INVENTION

Therefore, the object of the present invention is to provide an electric lighting driver circuit that is less expensive to produce.

Accordingly, an electric lighting driver circuit of the present invention is for electrically connecting to a direct current (DC) power source and for driving an illuminating unit to emit light. The electric lighting driver circuit comprises a flyback converting unit for converting a DC input voltage from the DC power source to a low ripple DC voltage, and a first half-bridge converting unit electrically connected to the flyback converting unit, for converting the low ripple DC voltage to a low frequency, rectangular wave output voltage to drive the illuminating unit to emit light.

The flyback converting unit includes a dual-output winding transformer electrically connected to the first half-bridge converting unit. The dual-output winding transformer includes a first winding at a primary side of the dual-output winding transformer and a second winding and a third winding at a secondary side of the dual-output winding transformer. The third winding converts leakage inductance attributed to the first winding and the second winding to electrical energy that is provided to the first half-bridge converting unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
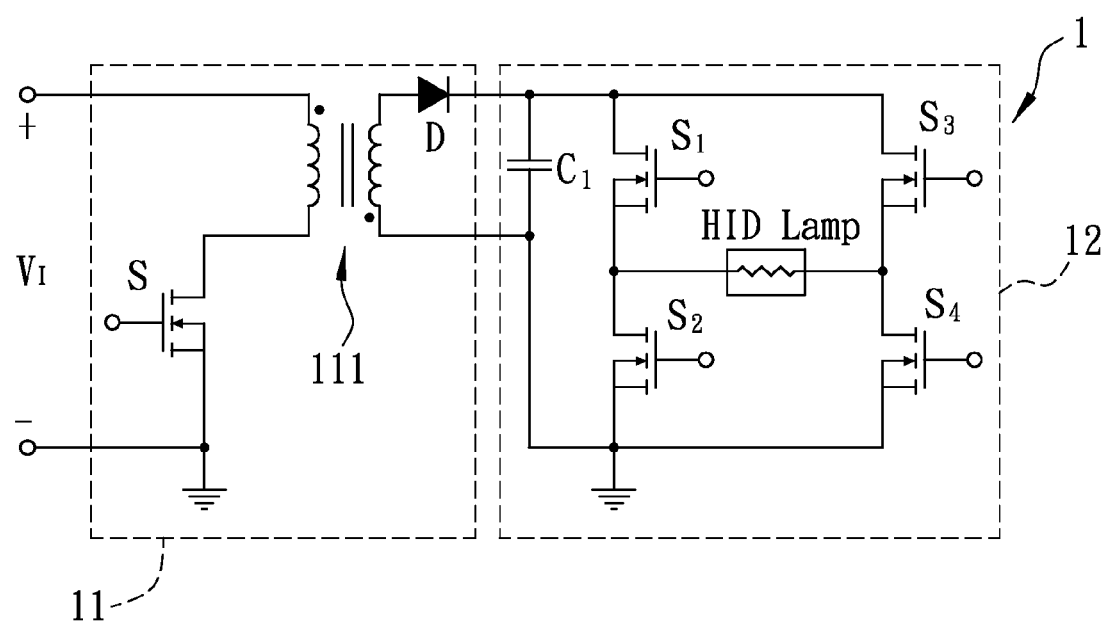
FIG. 1 is a circuit diagram of a conventional electric lighting driver circuit.
Figure 2:
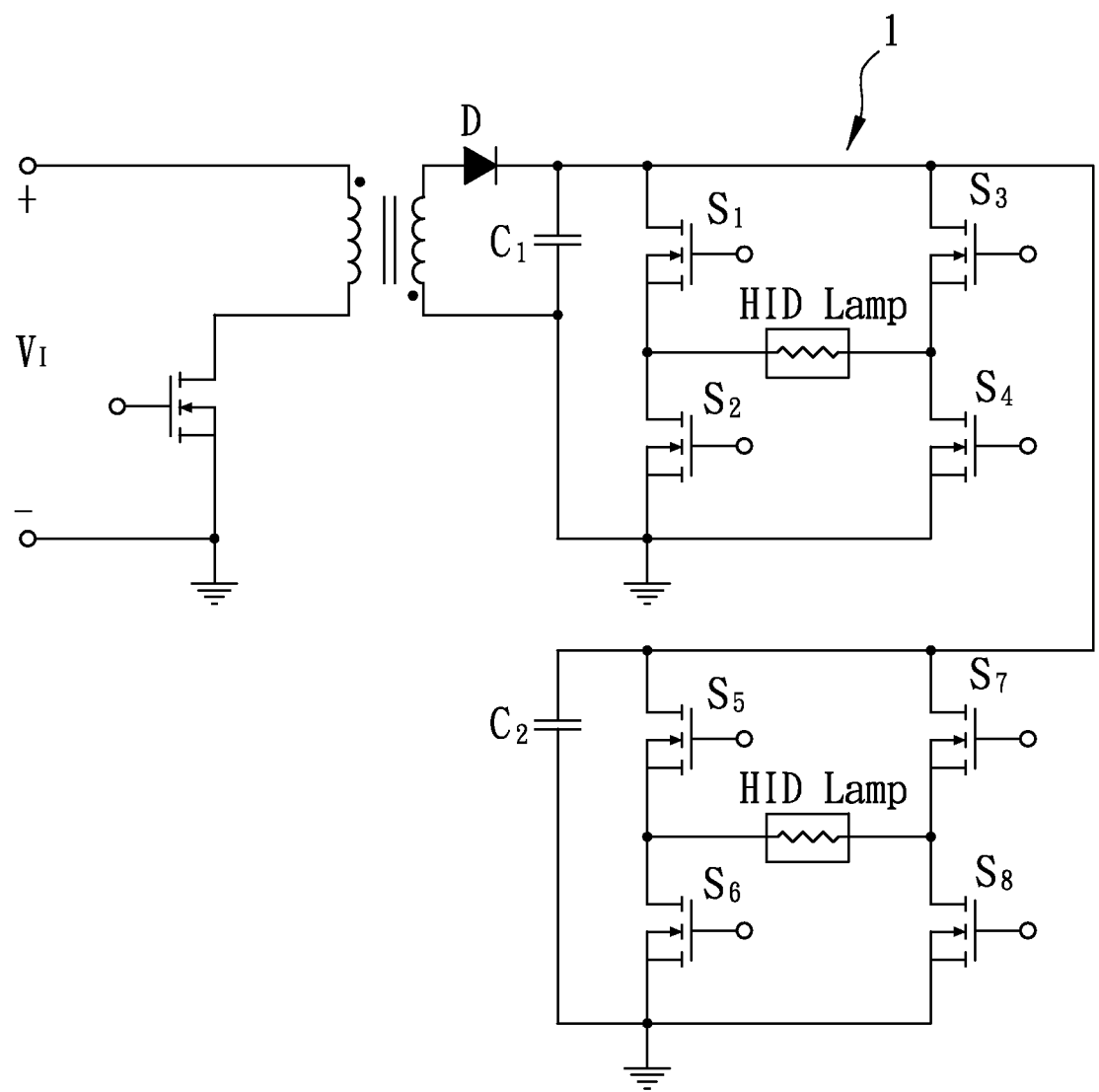
FIG. 2 is a circuit diagram of an extended structure of the conventional electric lighting driver circuit.

Before the present invention is described in greater detail, it should be noted that like elements are denoted by the same reference numerals throughout the disclosure.

Figure 3:
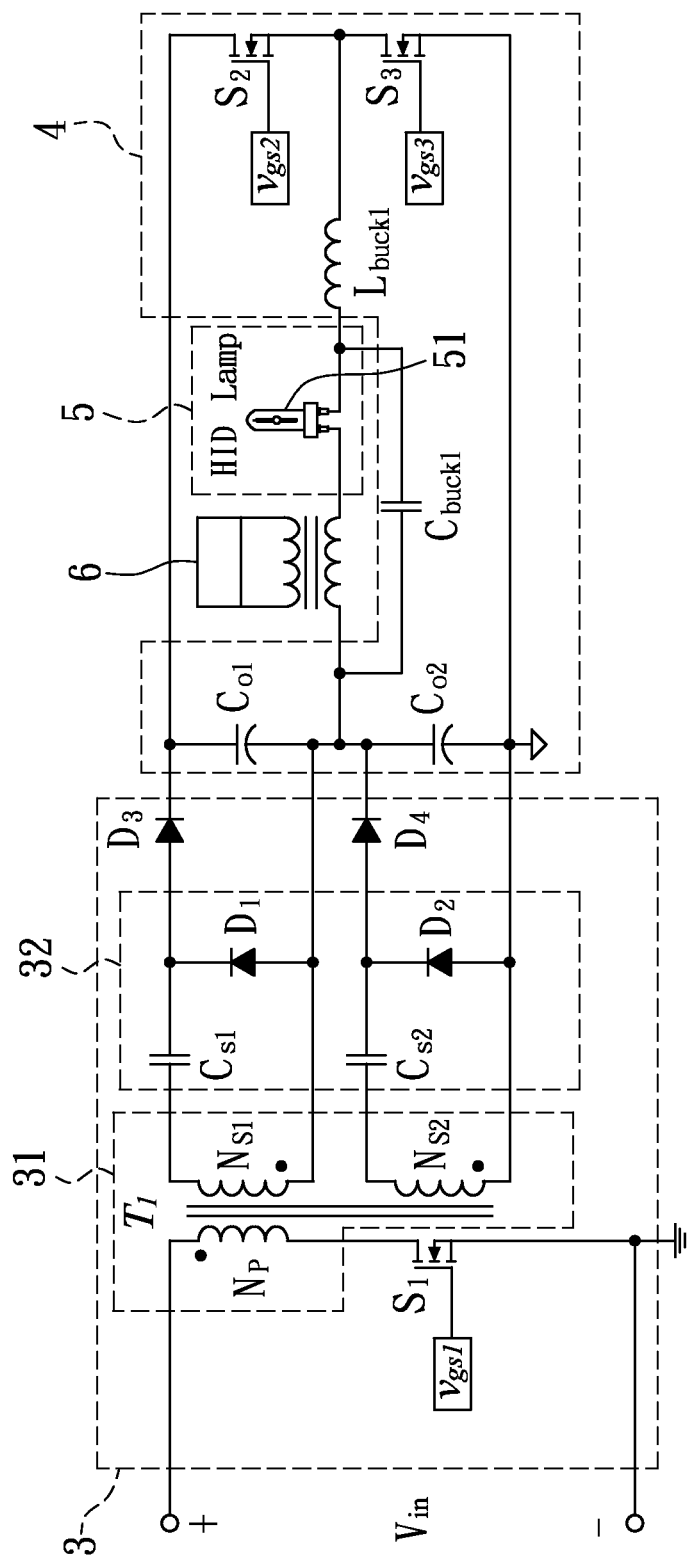
FIG. 3 is a circuit diagram of a first preferred embodiment of an electric lighting driver circuit according to the invention.

As shown in FIG. 3, the first preferred embodiment of an electric lighting driver circuit according to the present invention comprises a flyback converting unit 3, a first half-bridge converting unit 4 electrically connected to the flyback converting unit 3, and an illuminating unit 5 electrically connected to the flyback converting unit 3 and the first half-bridge converting unit 4. The flyback converting unit 3 is electrically connected to a direct current (DC) power source $V_{in}$, and cooperates with the first half-bridge converting unit 4 for driving the illuminating unit 5 to emit light.

The flyback converting unit 3 includes a dual-output winding transformer 31, a first power switch $S_1$, a voltage multiplier module 32, and a first diode $D_3$ and a second diode $D_4$ that electrically interconnect the voltage multiplier module 32 and the first half-bridge converting unit 4. The dual-output winding transformer 31 is configured to boost a DC input voltage from the DC power source $V_{in}$, and converts leakage inductance to electrical energy that is provided at an output node of the dual-output winding transformer 31. The first power switch $S_1$ is electrically connected to the dual-output winding transformer 31 and controls supply of the DC input voltage to the dual-output winding transformer 31. The voltage multiplier module 32 electrically interconnects the dual-output winding transformer 31 and the first half-bridge converting unit 4. The first power switch $S_1$ is operated at a high frequency to boost the DC input voltage to a high DC voltage.

The dual-output winding transformer 31 includes a first winding $N_P$ at a primary side of the dual-output winding transformer 31 and a second winding $N_{S1}$ and a third winding $N_{S2}$ at a secondary side of the dual-output winding transformer 31. Each of the first winding $N_P$, the second winding $N_{S1}$ and the third winding $N_{S2}$ has a first end and a second end. The first end and the second end of the first winding $N_P$ are electrically connected to the DC power source $V_{in}$ and the first power switch $S_1$, respectively. Specifically, the third winding $N_{S2}$ converts leakage inductance attributed to the first winding $N_P$ and the second winding $N_{S1}$ to electrical energy that is provided to the first half-bridge converting unit 4.

The voltage multiplier module 32 includes a first step-up capacitor $C_{S1}$, a second step-up capacitor $C_{S2}$, a first step-up diode $D_1$ and a second step-up diode $D_2$. The first step-up capacitor $C_{S1}$ electrically interconnects an anode of the first diode $D_3$ and the first end of the second winding $N_{S1}$. The second step-up capacitor $C_{S2}$ electrically interconnects an anode of the second diode $D_4$ and the first end of the third winding $N_{S2}$. The first step-up diode $D_1$ has a cathode electrically connected to the anode of the first diode $D_3$, and an anode electrically connected to the second end of the second winding $N_{S1}$. The second step-up diode $D_2$ has a cathode electrically connected to the anode of the second diode $D_4$, and an anode electrically connected to a second end of the third winding $N_{S2}$.

The first half-bridge converting unit 4 includes a first output capacitor $C_{O1}$, a second output capacitor $C_{O2}$, a second power switch $S_2$, a third power switch $S_3$, a first buck inductor $L_{buck1}$ and a first capacitor $C_{buck1}$. The first output capacitor $C_{O1}$ electrically interconnects a cathode of the first diode $D_3$ and the second end of the second winding $N_{31}$. The second output capacitor $C_{O2}$ electrically interconnects a cathode of the second diode $D_4$ and the second end of the third winding $N_{S2}$. The second power switch $S_2$ has a first switch terminal electrically connected to the cathode of the first diode $D_3$, and a second switch terminal. The third power switch $S_3$ interconnects the second switch terminal of the second power switch $S_2$ and the second end of the third winding $N_{S2}$. The third power switch $S_3$ has a first switch terminal electrically connected to the second switch terminal of the second power switch $S_2$. The second power switch $S_2$ and the third power switch $S_3$ are adapted to operate at both high frequency rectangular wave and low frequency rectangular wave. In this configuration, the half-bridge converting unit 4 is capable of converting the high DC voltage generated by the flyback converting unit 3 to a low-frequency AC rectangular voltage, which is subsequently fed to the illuminating unit 5.

The first buck inductor $L_{buck1}$ connects electrically the first switch terminal of the third power switch $S_3$ to the illuminating unit 5. The first capacitor $C_{buck1}$ has an end electrically connected to the illuminating unit 5 and the first buck inductor $L_{buck1}$, and another end electrically connected to the first output capacitor $C_{O1}$ and the second output capacitor $C_{O2}$.

The illuminating unit 5 includes a first lamp 51. In this embodiment, the first lamp 51 is configured as a high intensity discharge (HID) lamp, but may be configured as other illuminating components in other embodiments of the invention.

The electric lighting driver circuit further comprises a first lighting unit 6 that electrically connects the first half-bridge converting unit 4 to the first lamp 51 and that is for increasing the probability to light the first lamp 51.

The first capacitor $C_{buck1}$ is disposed in parallel with the first lamp 51 and the first lighting unit 6 so as to buck the DC output voltage to a steady-state voltage, and to cooperate with the first capacitor $C_{buck1}$ to filter out high frequency ripples attributed to the second power switch $S_2$ and the third power switch $S_3$. This configuration is to avoid acoustic resonance that usually occurs when the electric lighting driver circuit is operated in a high frequency, and may cause instability (i.e., flashing) to the light emitted by the HID lamp, and even lamp malfunction.

In use, the DC input voltage from the DC power source $V_{in}$ is fed into the flyback converting unit 3 of the electric lighting driver circuit, converted to the low ripple DC voltage by the dual-output winding transformer 31, and boosted by the voltage multiplier module 32. The first half-bridge converting unit 4 subsequently converts the boosted low ripple DC voltage to a rectangular wave output voltage that has both high-frequency and low-frequency components, which is for driving the second power switch $S_2$ and the third power switch $S_3$ to supply an output voltage to the first lamp 51 of the illuminating unit 5. The first lamp 51 consequently emits light.

Figure 4:
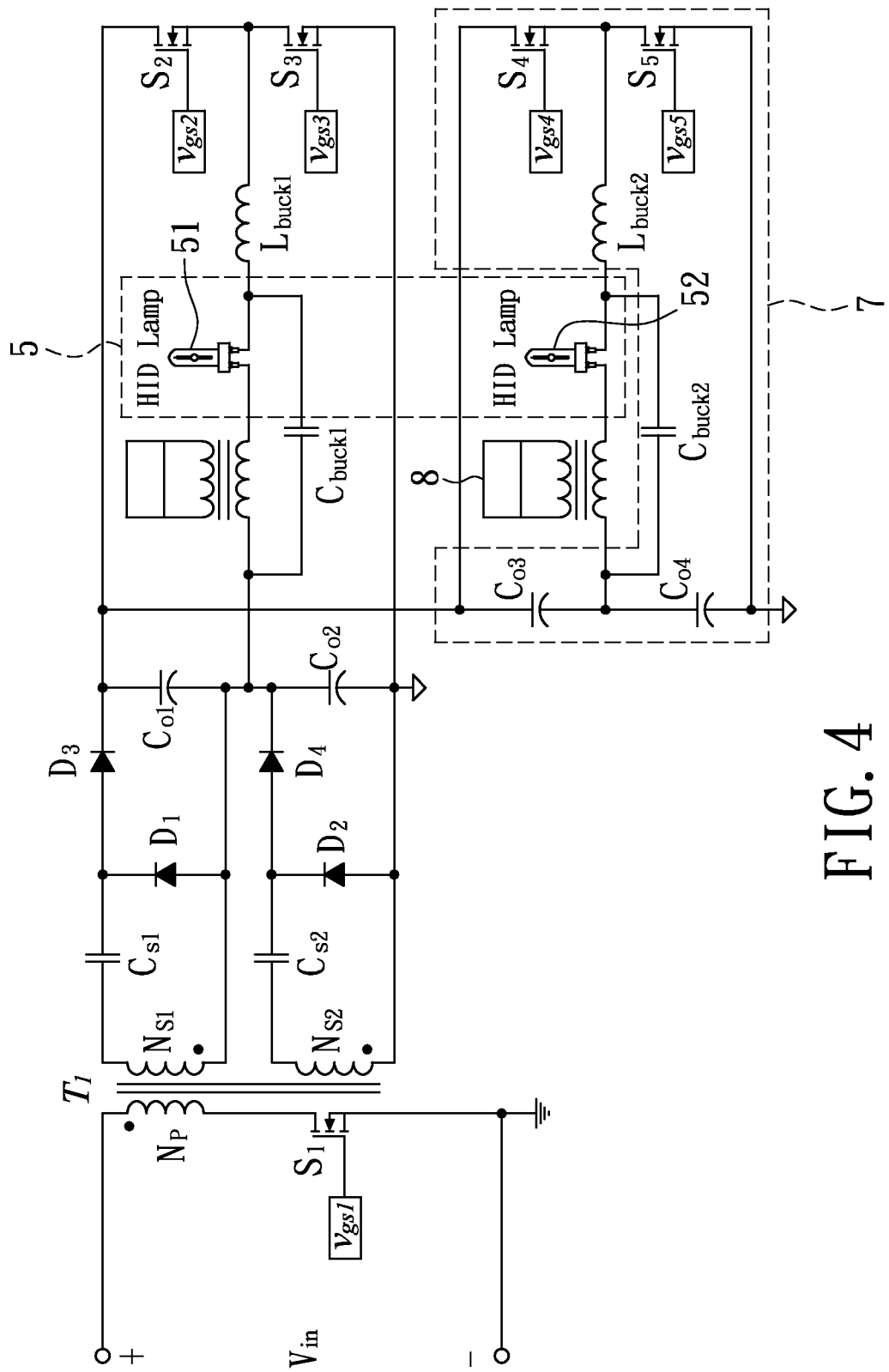
FIG. 4 is a circuit diagram of a second preferred embodiment of this invention.

As shown in FIG. 4, the second preferred embodiment of the electric lighting driver circuit according to the present invention has a structure similar to that of the first preferred embodiment. The main difference between this embodiment and the previous embodiment resides in the configuration of a second half-bridge converting unit 7 and a second lighting unit 8. Moreover, the illuminating unit 5 further includes a second lamp 52 which, like the first lamp 51, is configured as but not limited to a HID lamp in this embodiment.

The second half-bridge converting unit 7 includes a third output capacitor $C_{O3}$, a fourth output capacitor $C_{O4}$, a fourth power switch $S_4$, a fifth power switch $S_5$, a second buck inductor $L_{buck2}$ and a second capacitor $C_{buck2}$. Each of the fourth power switch $S_4$ and the fifth power switch $S_5$ has a first switch terminal and a second switch terminal. The first switch terminal of the fifth power switch $S_5$ is electrically connected to the second switch terminal of the fourth power switch $S_4$. The third output capacitor $C_{O3}$ electrically connects a cathode of the first diode $D_3$ to an end of the fourth output capacitor $C_{O4}$. Another end of the fourth output capacitor $C_{O4}$ is electrically connected to the second switch terminal of the fifth power switch $S_5$.

The first switch terminal of the fourth power switch $S_4$ is also electrically connected to the cathode of the first diode $D_3$. The second buck inductor $L_{buck2}$ connects electrically the first switch terminal of the fifth power switch $S_5$ to the second lamp 52 of the illuminating unit 5. The second capacitor $C_{buck2}$ has an end electrically connected to the second lamp 52 and the second buck inductor $L_{buck2}$, and another end electrically connected to the third output capacitor $C_{O3}$ and the fourth output capacitor $C_{O4}$. The second capacitor $C_{buck2}$ is also disposed in parallel with the second lamp 52 and the second lighting unit 8.

The second preferred embodiment enables the first half-bridge converting unit 4 and the second half-bridge converting unit 7 to respectively supply the output voltage to the first lamp 51 and the second lamp 52 for emitting light, and has the same advantages as those of the first preferred embodiment.

Figure 5:
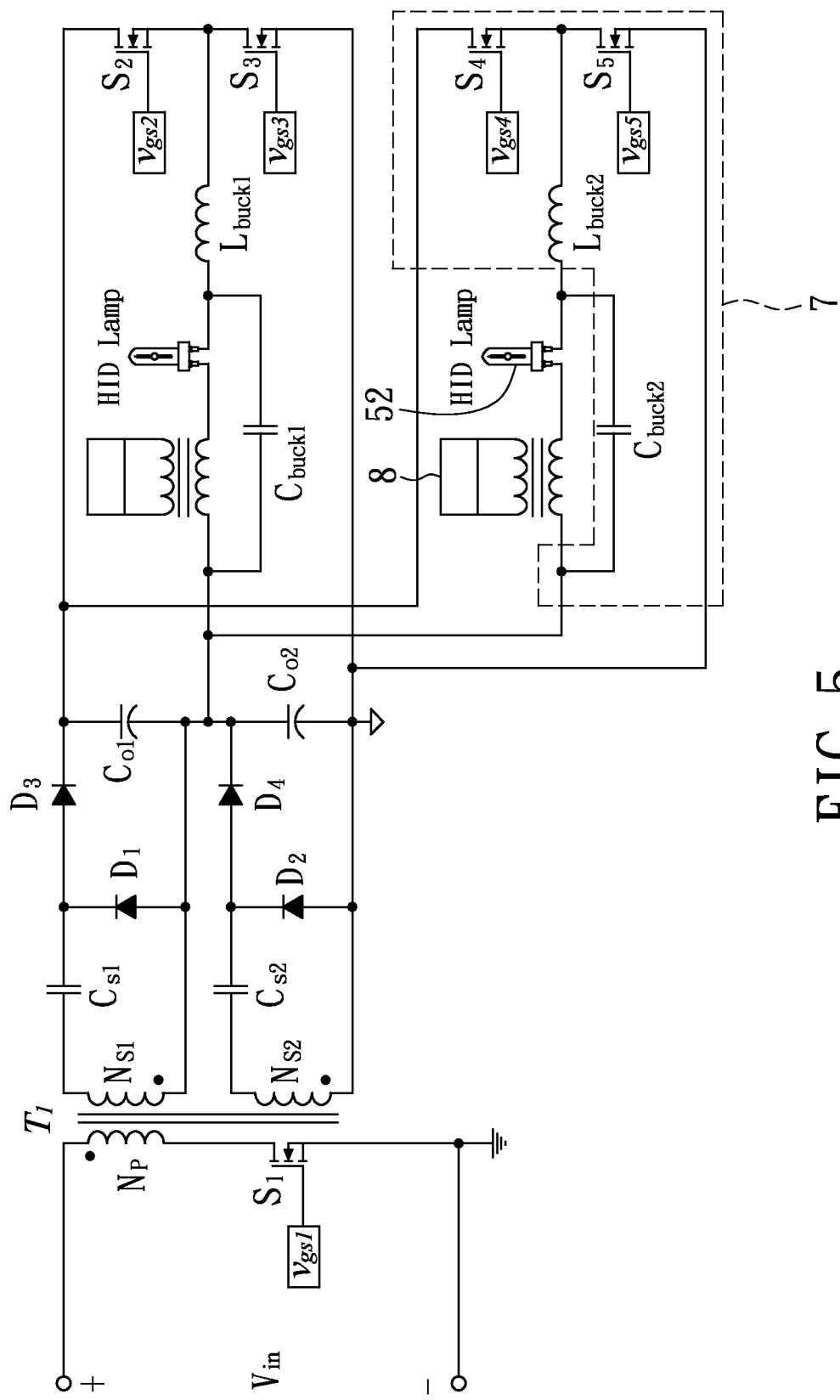
FIG. 5 is a circuit diagram of a third preferred embodiment of this invention.

As shown in FIG. 5, the third preferred embodiment of the electric lighting driver circuit according to the present invention has a structure similar to that of the second preferred embodiment. The main difference between this embodiment and the second preferred embodiment resides in the following. The third output capacitor $C_{O3}$ and the fourth output capacitor $C_{O4}$ of the second half-bridge converting unit 7 are omitted. Alternatively, the first switch terminal and the second switch terminal of the fourth power switch $S_4$ are electrically connected to the cathode of the first diode $D_3$ and the first switch terminal of the fifth power switch $S_5$, respectively. The second switch terminal of the fifth power switch $S_5$ is electrically connected to the second end of the third winding $N_{S2}$. The third preferred embodiment provides a relatively simpler structure, enables the second half-bridge converting unit 7 to supply the output voltage to the second lamp 52 for emitting light, and has the same advantages as those of the second preferred embodiment.

Figure 6:
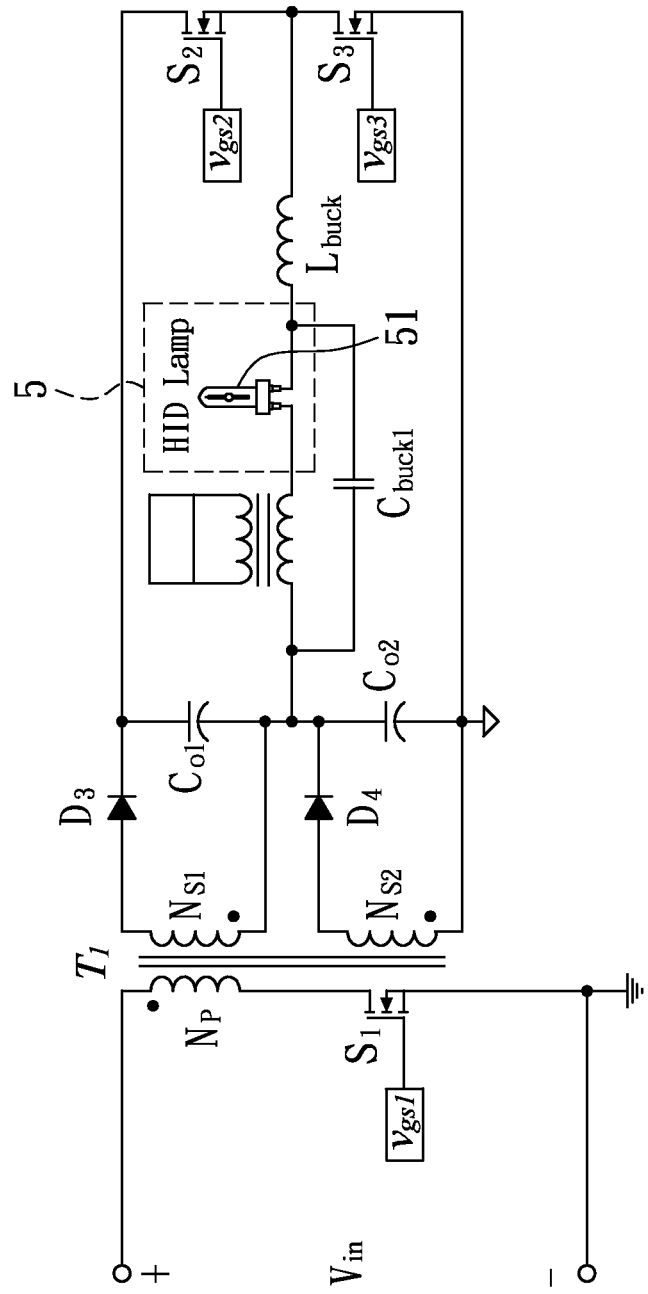
FIG. 6 is a circuit diagram of a fourth preferred embodiment of this invention.

As shown in FIG. 6, the fourth preferred embodiment of the electric lighting driver circuit according to the present invention has a structure similar to that of the first preferred embodiment. The main difference between this embodiment and the first preferred embodiment resides in the following. The voltage multiplier module 32 of the flyback converter 3 is omitted (see FIG. 3), thereby providing a further simplified structure but at the expense of a weaker lighting effect. The fourth preferred embodiment has the same advantages as those of the first preferred embodiment.

Figure 7:
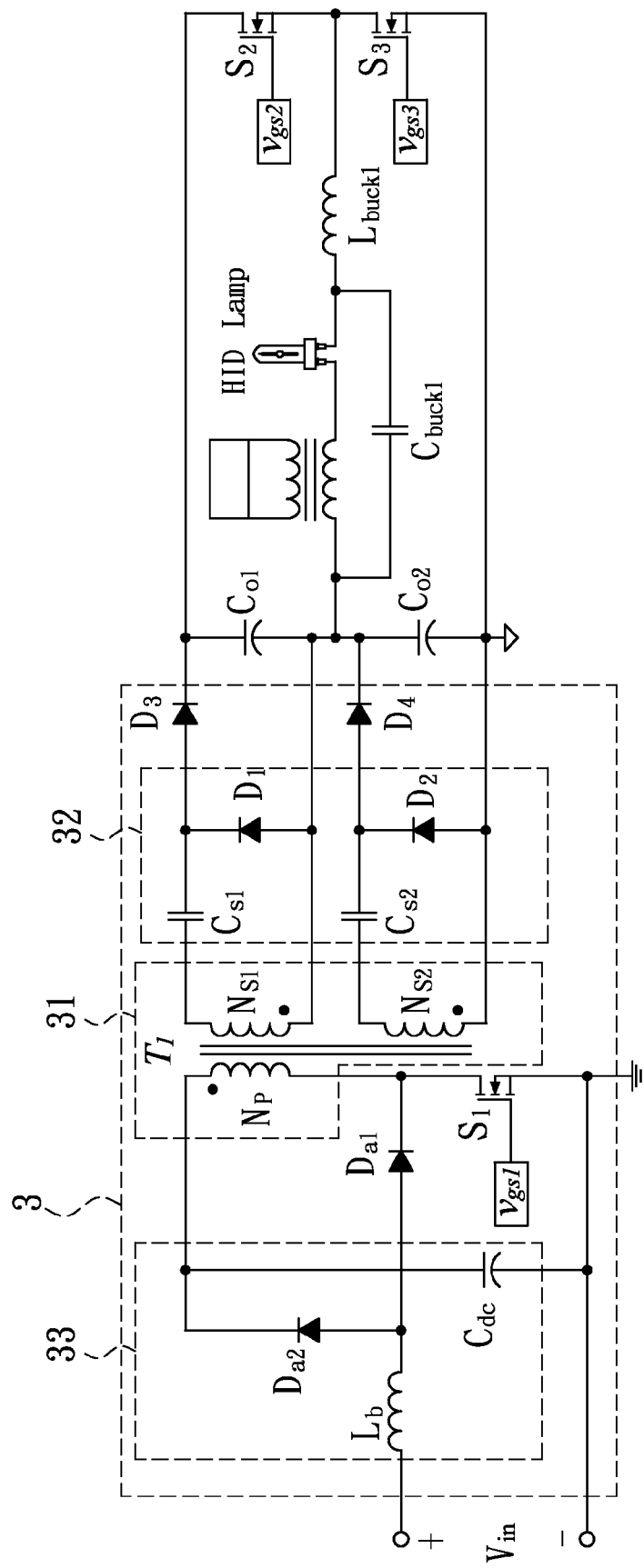
FIG. 7 is a circuit diagram of a fifth preferred embodiment of this invention.

As shown in FIG. 7, the fifth preferred embodiment of the electric lighting driver circuit according to the present invention has a structure similar to that of the first preferred embodiment. The main difference between this embodiment and the first preferred embodiment resides in the following. The flyback converting unit 31 further includes a voltage booster 33 that is configured to boost the DC input voltage, and a first boosting diode $D_{a1}$. The voltage booster 33 includes a boosting inductor $L_b$, a second boosting diode $D_{a2}$, and a boosting capacitor $C_{dc}$. The boosting inductor $L_b$ connects electrically the DC power source $V_{in}$ to an anode of the second boosting diode $D_{a2}$. A cathode of the second boosting diode $D_{a2}$ is electrically connected to the first end of the first winding $N_p$ of the dual-output winding transformer 31. The boosting capacitor $C_{dc}$ has an end electrically connected to the cathode of the second boosting diode $D_{a2}$ and the first end of the first winding $N_p$ of the dual-output winding transformer 31, and another end grounded.

The fifth preferred embodiment has the same advantages as those of the first preferred embodiment, and further employs the voltage booster 33 to boost the DC input voltage before feeding into the dual-output winding transformer 31, thereby enhancing the lighting effect.

Figure 8:
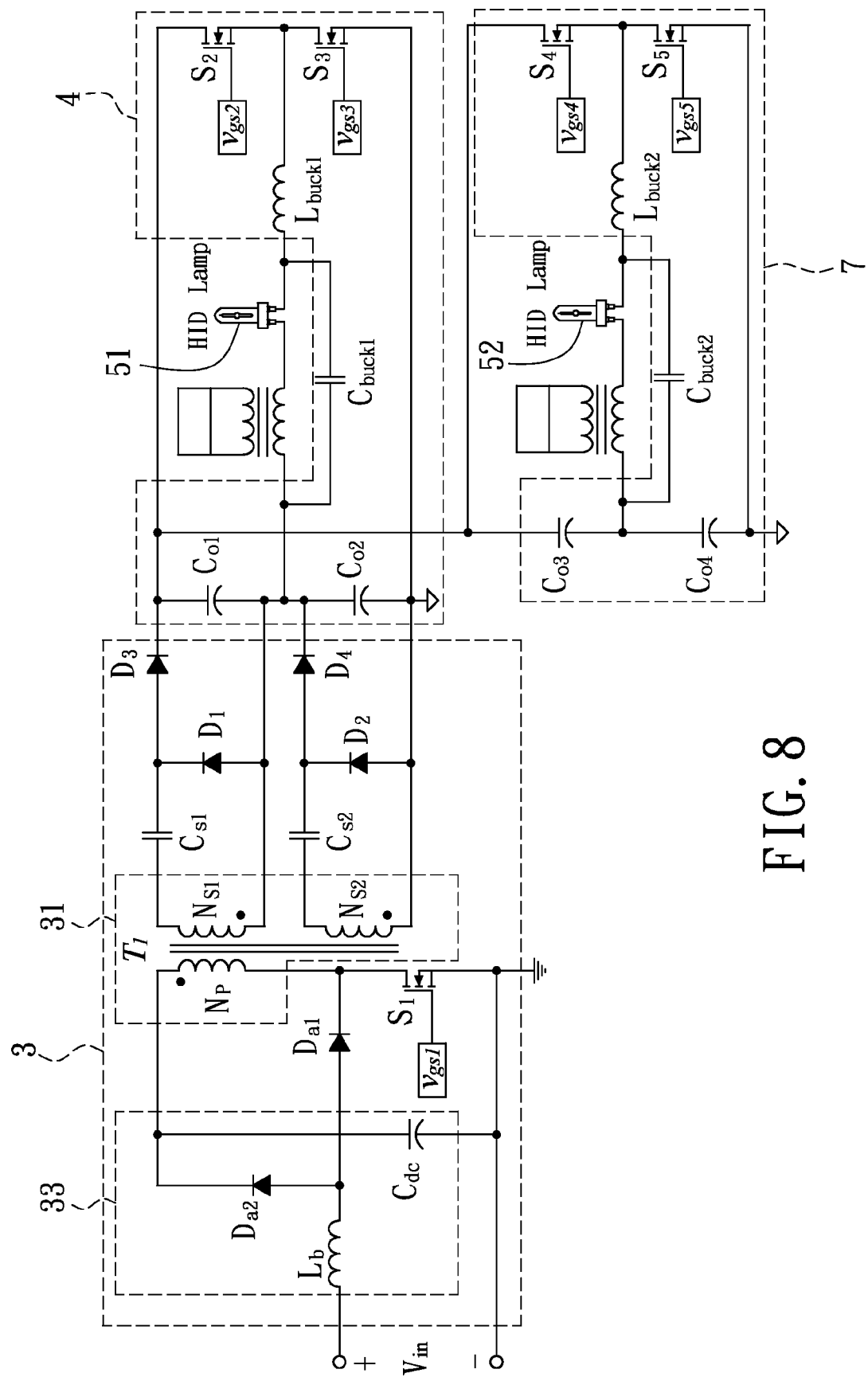
FIG. 8 is a circuit diagram of a sixth preferred embodiment of this invention.

As shown in FIG. 8, the sixth preferred embodiment of the electric lighting driver circuit according to the present invention has a structure similar to that of the fifth preferred embodiment. The main difference between this embodiment and the fifth preferred embodiment resides in the configuration of a second half-bridge converting unit 7 and a second lighting unit 8. The illuminating unit 5 also includes a second lamp (similar to the second preferred embodiment, see FIG. 4). The sixth preferred embodiment enables the first half-bridge converting unit 4 and the second half-bridge converting unit 7 to respectively supply the output voltage to the first lamp 51 and the second lamp 52 for emitting light, and has the same advantages as those of the fifth preferred embodiment.

Figure 9:
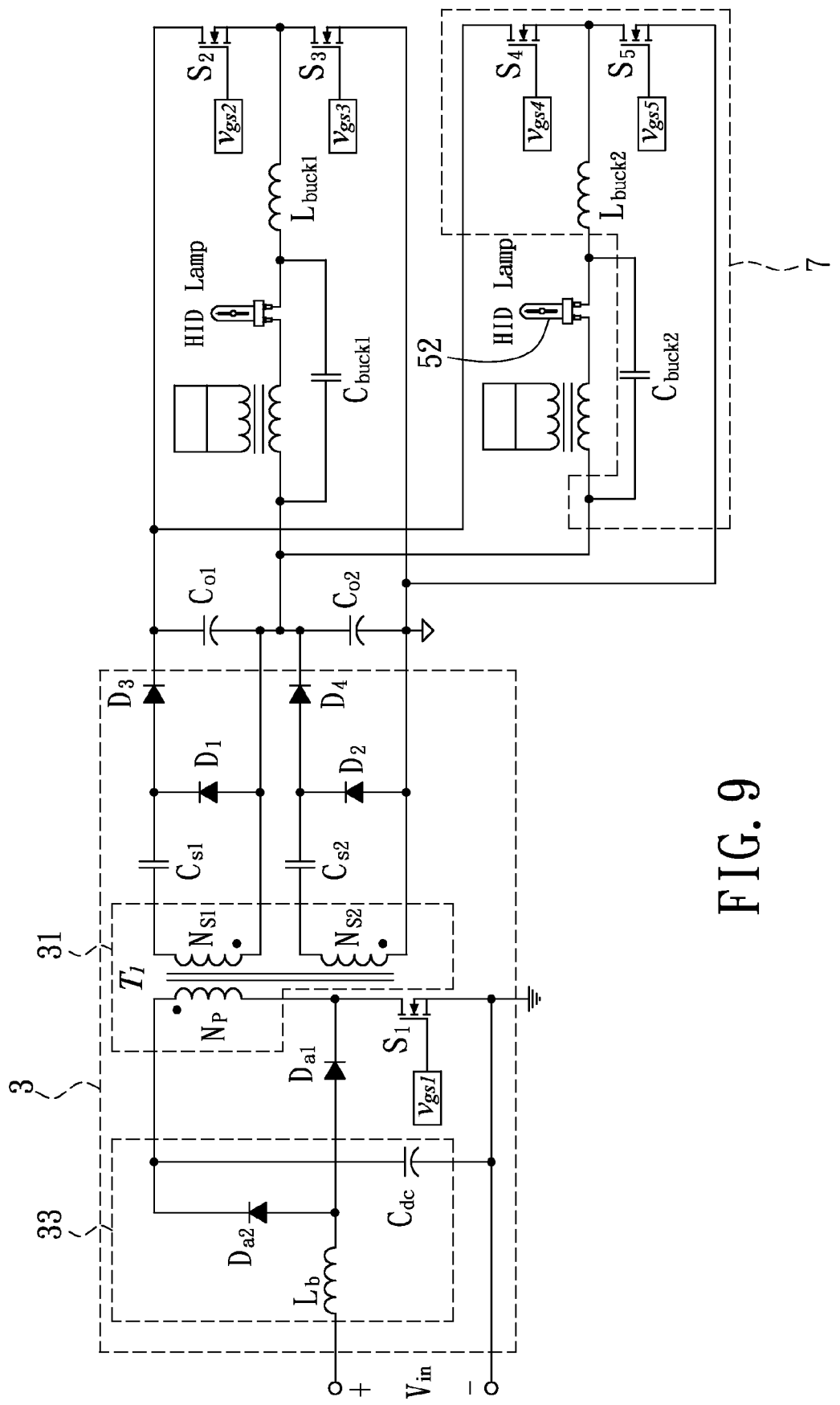
FIG. 9 is a circuit diagram of a seventh preferred embodiment of this invention.

As shown in FIG. 9, the seventh preferred embodiment of the electric lighting driver circuit according to the present invention has a structure similar to that of the sixth preferred embodiment. The main difference between this embodiment and the sixth preferred embodiment resides in the following. The third output capacitor $C_{O3}$ and the fourth output capacitor $C_{O4}$ of the second half-bridge converting unit 7 are omitted. Alternatively, the first switch terminal and the second switch terminal of the fourth power switch $S_4$ are electrically connected to the cathode of the first diode $D_3$ and the first switch terminal of the fifth power switch $S_5$, respectively. The second switch terminal of the fifth power switch $S_5$ is electrically connected to the second end of the third winding $N_{S2}$. The seventh preferred embodiment provides a relatively simpler structure, enables the second half-bridge converting unit 7 to supply the output voltage to the second lamp 52 for emitting light, and has the same advantages as those of the sixth preferred embodiment.

Figure 10:
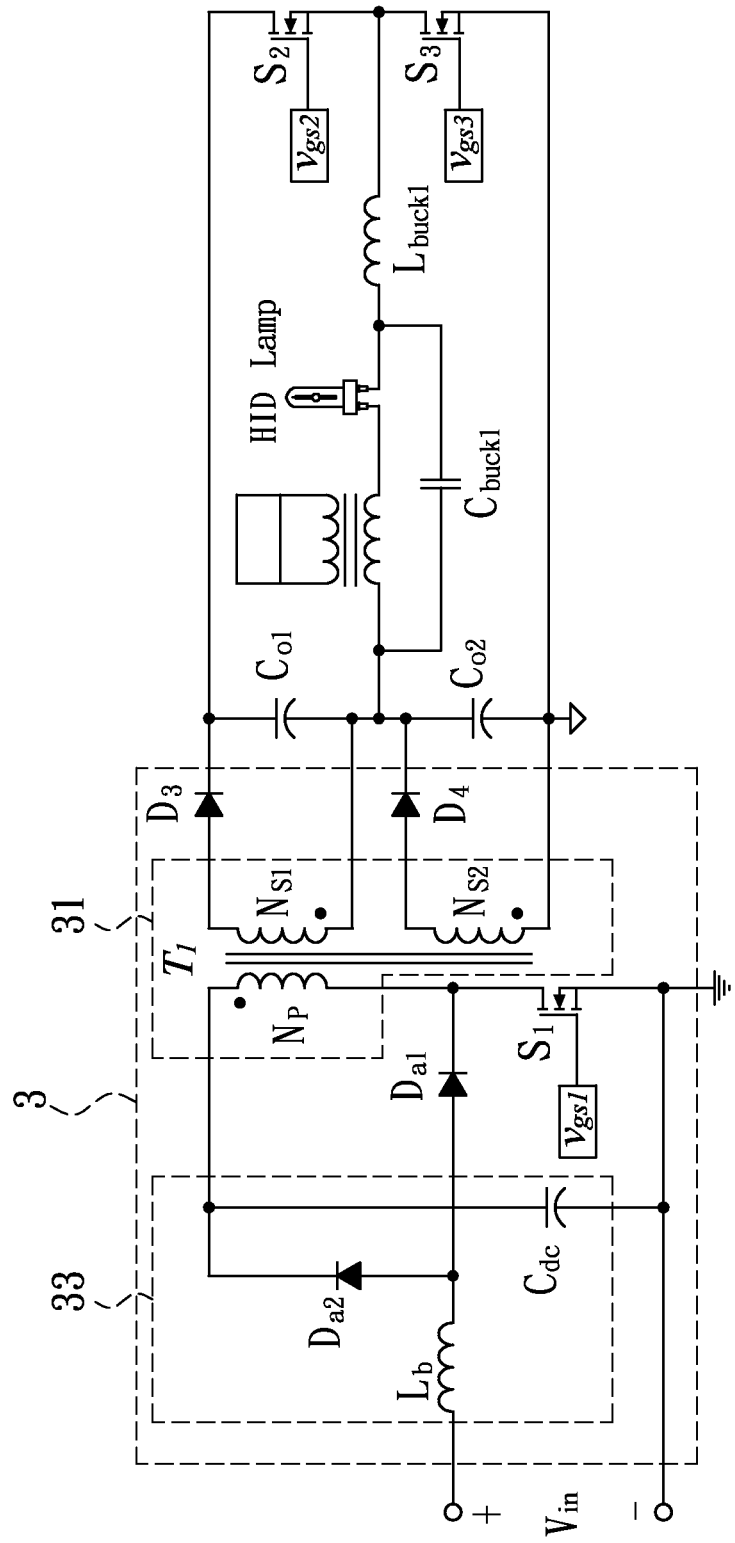
FIG. 10 is a circuit diagram of an eighth preferred embodiment of this invention.

As shown in FIG. 10, the eighth preferred embodiment of the electric lighting driver circuit according to the present invention has a structure similar to that of the fifth preferred embodiment. The main difference between this embodiment and the fifth preferred embodiment resides in the following. The voltage multiplier module 32 of the flyback converter 3 is omitted (see FIG. 3), thereby providing a further simplified structure but at the expense of a weaker lighting effect. The eighth preferred embodiment has the same advantages as those of the fifth preferred embodiment.

To sum up, the effect of this invention is that by having the third winding $N_{S2}$ convert leakage inductance attributed to the first winding $N_p$ and the second winding $N_{S1}$ to electrical energy that is provided to the first half-bridge converting unit 4, by having the first half-bridge converting unit 4 include two power switches $S_1$ and $S_2$ instead of four as disclosed in the conventional configuration (see FIG. 1), and by having the first buck inductor $L_{buck1}$ and the first capacitor $C_{buck1}$ cooperate to filter out high frequency ripples attributed to the second power switch $S_2$ and the third power switch $S_3$, this invention achieves higher efficiency and lower manufacturing costs, and avoids undesired audio frequency resonance in practical use.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electric lighting driver circuit for electrically connecting to a direct current (DC) power source and for driving an illuminating unit to emit light, said electric lighting driver circuit comprising:
    a flyback converting unit for converting a DC input voltage from the DC power source to a low ripple DC voltage; and
    a first half-bridge converting unit electrically connected to said flyback converting unit, for converting the low ripple DC voltage to a low frequency, rectangular wave output voltage to drive the illuminating unit to emit light;
    said flyback converting unit including a dual-output winding transformer electrically connected to said first half-bridge converting unit, said dual-output winding transformer including a first winding at a primary side of said dual-output winding transformer and a second winding and a third winding at a secondary side of said dual-output winding transformer, said third winding converting leakage inductance attributed to said first winding and said second winding to electrical energy that is provided to said first half-bridge converting unit;
    wherein said flyback converting unit further includes a first power switch that is electrical) connected to said dual-output winding transformer and that controls supply of the DC input voltage to said dual-output winding transformer;
    wherein said flyback converting unit further includes a voltage multiplier module electrically interconnecting said dual-output winding transformer and said first half-bridge converting unit;
    wherein said flyback converting unit further includes a first diode and a second diode that electrically interconnect said voltage multiplier module and said first half-bridge converting unit;
    wherein said voltage multiplier module includes:
        a first step-up capacitor electrically interconnecting an anode of said first diode and a first end of said second winding;
        a second step-up capacitor electrically interconnecting an anode of said second diode and a first end of said third winding;

a first step-up diode having a cathode electrically connected to said anode of said first diode, and an anode electrically connected to a second end of said second winding; and a second step-up diode having a cathode electrically connected to said anode of said second diode and an anode electrically connected to a second end of said third winding;

wherein said first half-bridge converting unit includes:

a first output capacitor electrically interconnecting a cathode of said first diode and said second end of said second winding;

a second output capacitor electrically interconnecting a cathode of said second diode and said second end of said third winding;

a second power switch having a first switch terminal electrically connected to said cathode of said first diode, and a second switch terminal; and a third power switch that interconnects said second switch terminal of said second power switch and said second end of said third winding;

wherein said third power switch has a first switch terminal electrically connected to said second end of said second power switch, and said first half-bridge converting unit further includes:

a first buck inductor to connect electrically said first switch terminal of said third power switch to the illuminating unit; and a first capacitor having an end electrically connected to the illuminating unit and said first buck inductor and another end electrically connected to said first output capacitor and said second output capacitor;

said first buck inductor being configured to buck the DC output voltage to a steady-state voltage, and cooperating with said first capacitor to filter out high frequency ripples attributed to said second power switch and said third power switch.

2. The electric lighting driver circuit as claimed in claim 1, wherein said flyback converting unit further includes a voltage booster that is configured to boost the DC input voltage.

3. The electric lighting driver circuit as claimed in claim 1, the illuminating unit including a first lamp, said electric lighting driver circuit further comprising a first lighting unit for electrically connecting said first half-bridge converting unit to the first lamp.

4. An electric lighting driver circuit for electrically connecting to a direct current (DC) power source and for driving an illuminating unit to emit light, the illuminations unit including a first lamp and a second lamp, said electric lighting driver circuit comprising:

a flyback converting unit for converting a DC input voltage from the DC power source to a low ripple DC voltage; and a first half-bridge converting unit electrically connected to said flyback converting unit, for converting the low ripple DC voltage to a low frequency, rectangular wave output voltage to drive the illuminating unit to emit light;

said flyback converting unit including a dual-output winding transformer electrically connected to said first half-bridge converting unit, said dual-output winding transformer including a first winding at a primary side of said dual-output winding transformer and a second winding and a third winding at a secondary side of said dual-output winding transformer, said third winding converting leakage inductance attributed to said first winding and said second winding to electrical energy that is provided to said first half-bridge converting unit; and said electric lighting driver circuit further comprising a first lighting unit for electrically connecting said first half-bridge converting unit to the first lamp; and a second half-bridge converting unit electrically connected to said first half-bridge converting unit, and a second lighting unit for electrically connecting said second half-bridge converting unit to the second lamp.

* * * * *